(12) United States Patent
Prasad et al.

(10) Patent No.: US 12,132,691 B2
(45) Date of Patent: Oct. 29, 2024

(54) AUTOMATED MESSAGE BROKER DISCOVERY

(71) Applicant: Dell Products L.P., Round Rock, TX (US)

(72) Inventors: Parmeshwr Prasad, Bangalore (IN); Rushyendra Velamuri, Bangalore (IN); Raveendra Babu Madala, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 18/154,387

(22) Filed: Jan. 13, 2023

(65) Prior Publication Data

US 2024/0244019 A1    Jul. 18, 2024

(51) Int. Cl.
*G06F 15/16* (2006.01)
*H04L 51/21* (2022.01)

(52) U.S. Cl.
CPC .................................. *H04L 51/21* (2022.05)

(58) Field of Classification Search
CPC ........................................................ H04L 51/21
USPC ............................................................ 709/206
See application file for complete search history.

(56) References Cited

U.S. PATENT DOCUMENTS

| | | | |
|---|---|---|---|
| 6,738,363 B1* | 5/2004 | Best | H04W 72/56 370/347 |
| 2017/0187785 A1* | 6/2017 | Johnson | H04L 51/42 |
| 2019/0373083 A1* | 12/2019 | Nucci | H04L 63/062 |
| 2020/0065086 A1* | 2/2020 | Woodmansee | G06F 9/5072 |
| 2021/0289001 A1* | 9/2021 | Wilson | H04L 63/101 |
| 2023/0014973 A1* | 1/2023 | Singha | G06F 9/45558 |
| 2023/0142108 A1* | 5/2023 | Iyer | G06F 9/542 719/314 |

* cited by examiner

*Primary Examiner* — Yves Dalencourt
(74) *Attorney, Agent, or Firm* — Amin, Turocy & Watson, LLP

(57) ABSTRACT

Architectures and techniques are described that, in the context of a microservice platform, can provide automated discovery and configuration of message brokers on behalf of resident microservices. As a result, microservices no longer need to be tightly bound to a particular message broker. Hence, significant coding changes for microservices developers can be avoided over the lifetime of a particular microservice.

20 Claims, 11 Drawing Sheets

AUTOMATED MESSAGE BROKER DISCOVERY

BACKGROUND

Due to recent developments, microservices and microservice platforms have seen a significant rise in popularity. Historically, applications have been monolithic in nature such that most functions and services are tightly coupled and managed by a single application. Unfortunately, if an application goes down (fails), typically, all functions or services provided by that application are unavailable because this monolithic nature operates as a single point of failure. However, as a result of the introduction of microservices, monolithic applications are being modularized or broken up into many different microservices.

Hence, microservice architectures replace monolithic applications with a collection of independent services that are highly maintainable and testable, loosely coupled, and independently deployable. Thus, microservices can be preferred with respect to scalability, team autonomy, and development since microservice architecture can allow a decoupling of processes and services. Each microservice can have its own data model, can manage its own data, and can mitigate the single point of failure associated with monolithic applications. If a microservice fails, the failure can be isolated to that individual microservice to prevent cascading failures that would otherwise cause a monolithic application to fail. This fault isolation potential can help critical applications to stay up and running even when one of its modules fails.

In a microservices platform, data moves between microservices (e.g., from a data producer/sender to a data consumer/recipient) using "dumb pipes" referred to as message brokers. Hence, message brokers have evolved into a backbone of microservice environments.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
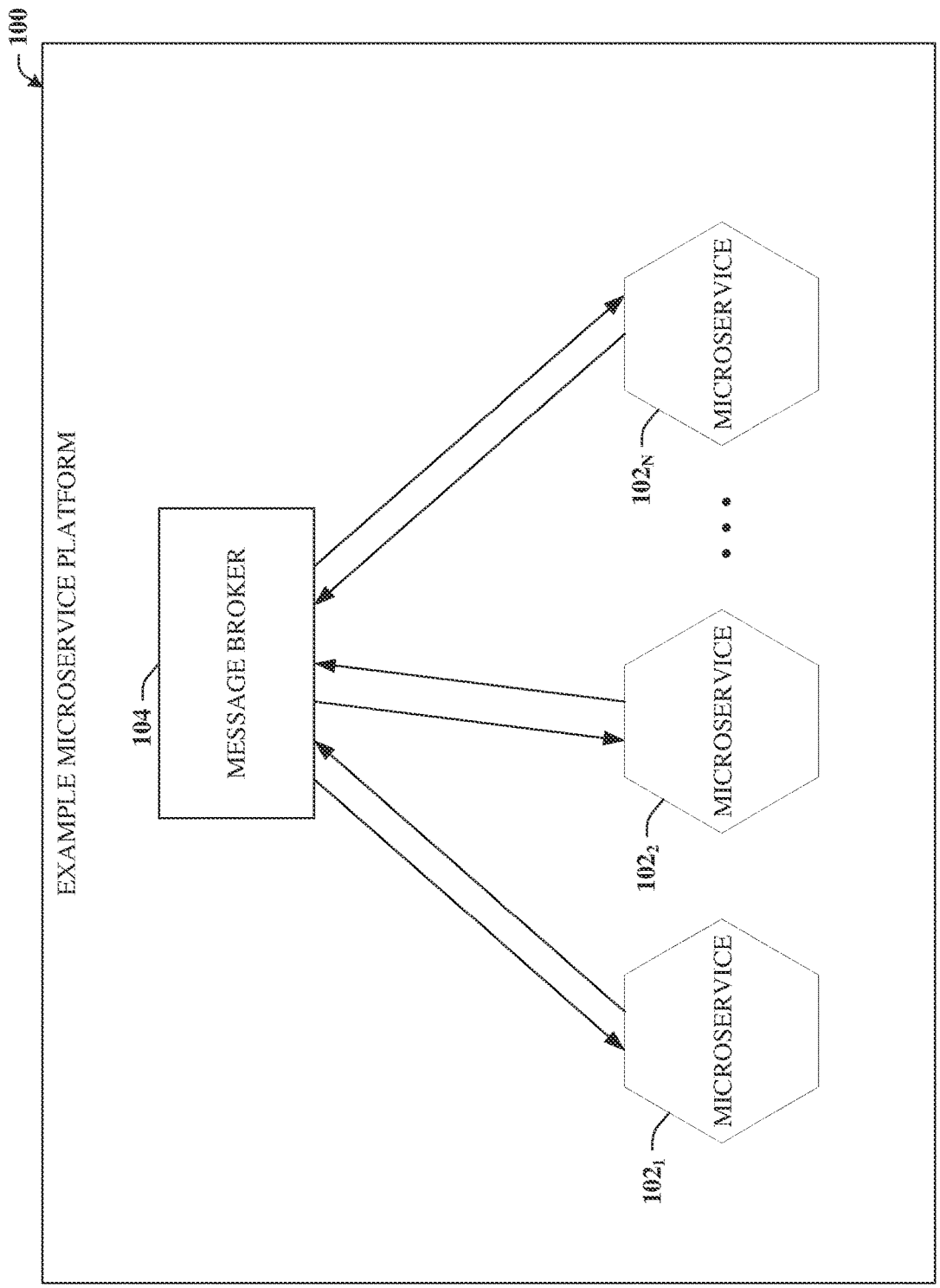
FIG. 1 depicts a schematic block diagram of an example microservices platform 100 in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In order to better describe the disclosed subject matter, it can be instructive to consider an example of a microservices platform, an example of which can be found at FIG. 1.

With reference now to FIG. 1, a schematic block diagram of an example microservices platform 100 in accordance with certain embodiments of this disclosure. For example, microservices platform 100 can be a cloud-based platform that accommodates a number of microservices $102_1$-$102_N$, where N can be any suitable positive integer. It should be understood that the at least one microservice $102_1$-$102_N$ can be referred to herein, either collectively or individually as microservice 102, with appropriate subscripts employed generally only when useful or convenient to highlight various distinctions or to better impart the disclosed concepts.

As noted in the background section, microservices platform 100 can allow applications to decouple processes and services. A given microservice 102 can provide a unitary service that can be requested by other microservices 102, applications, or systems. Thus if microservice $102_1$ is to provide a service to microservice $102_2$, then microservice $102_1$ is often referred to as a sender or (data) producer whereas microservice $102_2$ is referred to as a recipient or (data) consumer.

In order to effectuate this arrangement, the sender (e.g., microservice $102_1$ in this example) transmits information to message broker 104, which then forwards that information to one or more recipients (e.g., microservice $102_2$ in this example). Message broker 104 enables microservices 102 (or other elements) to communicate with each other and exchange information. Typically, this is accomplished by translating messages between formal messaging protocols, which allows interdependent services (e.g., microservices 102) to talk with one another, even if those interdependent services were written in different languages or implemented on different platforms. Generally, message brokers (e.g., message broker 104) can validate, store, route, and deliver messages to the appropriate recipient(s). Message brokers effectively serve as intermediaries between the sender and the recipient, allowing senders to issue messages without knowing where the recipients are, whether or not they are active, or how many of them there are.

As can be seen, microservices platform 100 represents a different paradigm to systems implemented using monolithic applications, and this new paradigm offers numerous advantages. However, as microservices platforms have grown and gained in popularity, certain difficulties have arisen.

For example, whereas initially, there was only a single message broker on the market, today there are many. These include RabbitMQ, ActiveMQ, ApacheMQ, HornetQ, Fuse message broker, and many others. All the many different message brokers bring different design elements and, frequently, have different principles of operation and different goals. For example, one message broker may be devoted to providing data persistence, while another focuses on high throughput. Regardless of the many differences, one issue that confronts microservices is that in order to use a particular message broker, the microservice has to be coded properly for that particular message broker.

Hence, today, microservices are tightly coupled to a particular message broker, which creates a number of difficulties. For example, if a given microservice (e.g., microservice 102) is rolled out on a given microservice platform (e.g., microservice platform 100) and is tightly coupled to a message broker (e.g., message broker 104) that is utilized by that platform, then that particular microservice will not work on a second platform that uses a different message broker.

Rather, significant code changes will be needed to port the microservice to the second platform. For instance, the microservice code specific to the first message broker would need to be replaced by code specific to the second message broker in order to deploy the microservice on the second platform. Alternatively, the microservice code changes might add the capability to talk to the second message broker, but this can significantly increasing the amount of code in the microservice, making it bulky. Furthermore, it is not uncommon for a message broker to be updated. When that happens, every microservice that uses that particular message broker may require code updates as well.

In other words, in virtually all cloud deployments by organizations, common code approaches are used. Namely, code to handle advanced message queuing protocol (AMQP), which all microservices are coded to consume. This inherently causes the issue of making microservices bulky and tightly coupled. That is, the microservice is tightly coupled to a particular message broker and/or the microservice becomes bulky because to use a different message broker, different common libraries are need.

It is also observed that various properties of microservices platforms opens substantial opportunities to organizations to leverage for different systems, however, due to certain configuration and data synchronization issues that can arise, many of these organizations choose not to pursue adopting microservices. Another challenge exists in that, currently, if a given microservices platform chooses to provide multiple message brokers, each with its own deployment team, it can be difficult to adapt the environment. For instance, microservices can end up adding redundant code along with the web stack to support different message brokers. Additionally, in current implementation, if a particular message broker goes down in the middle of service, bringing up a different message broker to take over for the failed broker without disrupting the workflow is not currently possible. Furthermore, if a service is finished or failed due to some reasons, its respective queue with a given message broker may not be cleaned, which can lead to issues.

In order to address these and other challenges, the disclosed subject matter provides a broker configuration utility or device, an example of which is further detailed in connection with FIG. 2.

Figure 2:
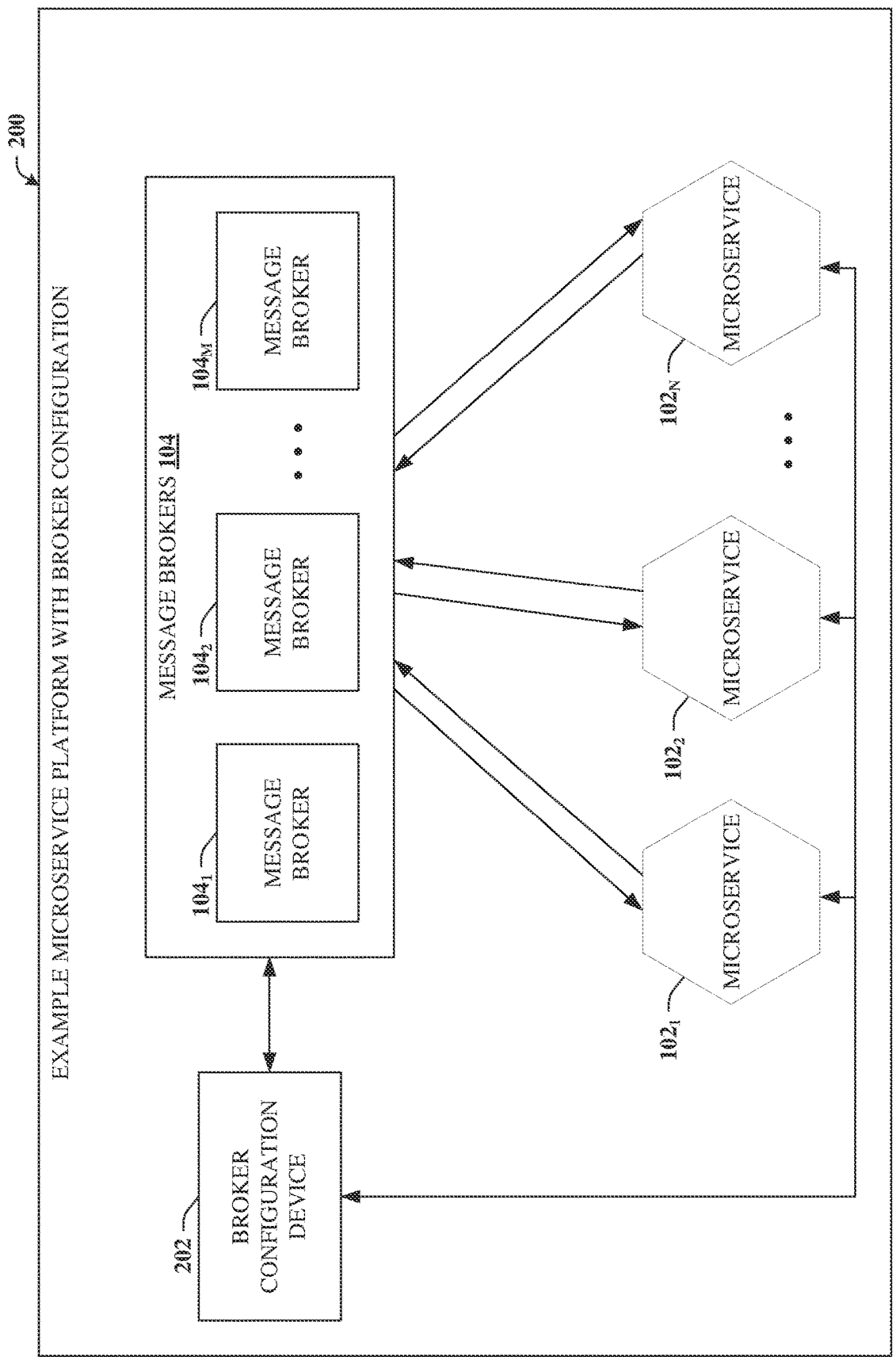
FIG. 2 depicts a schematic block diagram of an example microservices platform 200 with a broker configuration device in accordance with certain embodiments of this disclosure.

FIG. 2 illustrates a schematic block diagram of an example microservices platform 200 with a broker configuration device 202 in accordance with certain embodiments of this disclosure. As illustrated, broker configuration device 202 can operate as an interface between microservices 102 and any suitable number M of message brokers 104. Significantly, broker configuration device can provide both discovery and configuration for other elements on microservices platform 200.

As a result, the previous tightly coupled nature and potentially bulky solutions for microservices can be mitigated. For instance, code for communicating with any one of message brokers 104 can be maintained by broker configuration device 202 so there is no need to code microservice 102 for a specific one or set of message brokers 104 or maintain specific libraries for that purpose. Hence, if message broker 104 is updated or changed by the microservices platform 200, then such need not require significant code changes to any of the deployed microservices 102. Likewise, any given microservice 102 can now be deployed on any given microservices platform 200 (one with broker configuration device), even those that use different message broker(s), without any significant porting coding changes. Furthermore, if a given message broker 104 fails, communication can continue using a different message broker because microservices 102 are no longer bound to using only those message brokers 104 that the microservice was coded to support. Hence, a small code change to configure microservices 102 to talk to broker configuration device 202 can lead to a lifetime of reduced future maintenance costs and can encourage many organizations that are weary of those maintenance costs to adopt microservices platform 200.

In order for broker configuration device 202 to accomplish these and other related ends, it is observed that virtually all message brokers 104 work in three primary stages, which are further detailed in connection with FIGS. 5-7. For example, the first stage can be configuration and control. In this stage, essential resources can be allocated by the message broker. This can include creating logical space and associating a resource with some entity, for example, see FIG. 5 for additional detail.

The second stage can relate to data exchange. Typically, queues exist for the purpose of data exchange. The sender (e.g., data producer) will send data directly to an attached resource. The recipient (e.g., data consumer) can register a call back or read data directly from the resource. For example, see FIG. 6 for additional detail.

The third stage can be cleanup. For example, once message exchange is completed, resource cleanup can be required. Such might also be required when switching to a different kind of deployment. For additional detail, see FIG. 7.

In accordance with the disclosed subject matter, broker configuration device 202 can segregate these three primary stages. That is segregating configuration and control, data exchange, and cleanup to provide a dynamic and pluggable solution to the challenges that confront microservices platforms. However, initially, broker configuration device 202 can initially also provide discovery. For example, initially, in some embodiments, broker configuration device 202 can communicate with a cloud pipeline or other element to determine which message brokers 104 are currently deployed on microservices platform 200. In operation, a first microservice 102 interacts with broker configuration device 202, indicating a request for communication with a second microservice 102. Broker configuration device 202 can then interact with a given message broker 104 to create the resources for the requested communication. As examples, this can be exchanges and queues or the like. Broker configuration device 202 can return the status of the operations to the first microservice 102 and first microservice 102 can start sending message to second microservice 102. When there is a need of cleanup, first microservice 102 can interact with broker configuration device 202, which can then instruct message broker 104 to clean up allocated resources. Additional elements or aspects will become apparent with reference to the additional discussion herein.

Example Systems

Figure 3:
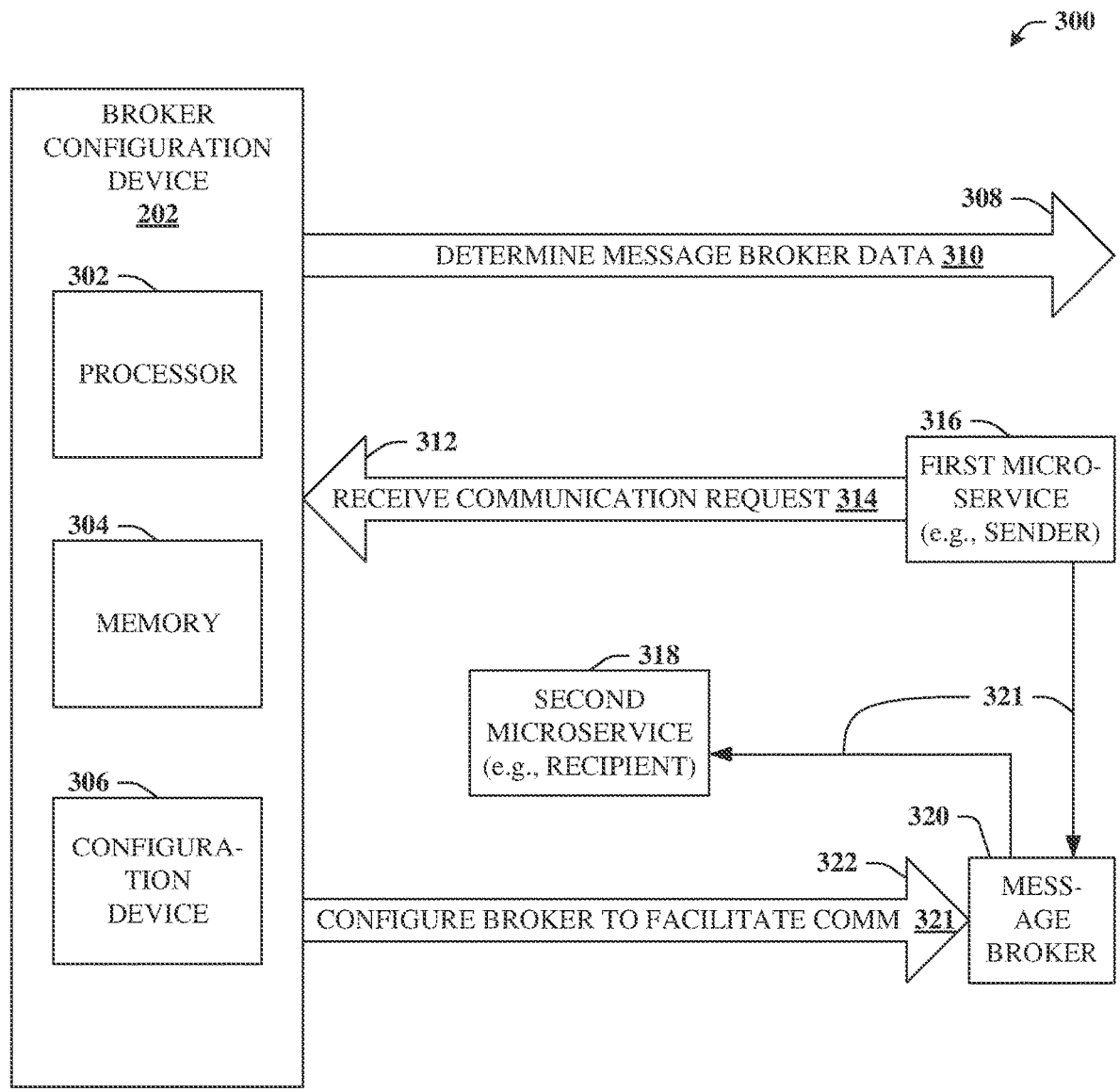
FIG. 3 depicts a schematic block diagram 300 illustrating an example broker configuration device that can configure a message broker on behalf of a microservice for a data exchange in accordance with certain embodiments of this disclosure.

Referring now to FIG. 3, a schematic block diagram 300 is depicted illustrating an example broker configuration device 202 that can configure a message broker on behalf of a microservice for a data exchange in accordance with certain embodiments of this disclosure. Broker configuration device 202 can comprise a processor 302 that can be specifically configured to automate various elements of a microservices platform such as microservices platform 200. Device 300 can also comprise memory 304 that stores executable instructions that, when executed by processor 302, can facilitate performance of operations. Processor 302 can be a hardware processor having structural elements known to exist in connection with processing units or circuits, with various operations of processor 302 being represented by functional elements shown in the drawings herein that can require special-purpose instructions, for example, stored in memory 304 and/or configuration device 306. Along with these special-purpose instructions, processor 302 and/or configuration device 306 can be a special-purpose device. Further examples of the memory 304 and processor 302 can be found with reference to FIG. 11. It is to be appreciated that broker configuration device 202 or computer 1102 can represent a server device of a communications network and can be used in connection with implementing one or more of the systems, devices, or components shown and described in connection with FIG. 3 and other figures disclosed herein.

At reference numeral 308, broker configuration device 202 can determine message broker data 310. Message broker data 310 can be indicative of a group of message brokers that are available via a microservice platform comprising microservice platform devices. An example of the various message brokers that can be discovered is illustrated by message brokers 104 of FIG. 2, showing message brokers $104_1$, $104_2$ and $104_M$. Thus, it is appreciated that broker configuration device 202 can provide and/or leverage a message broker discovery service and, in some embodiments, can maintain a list of active and deployed message brokers 104 as well as other information such as health information, security information, or other relevant data.

At reference numeral 312, broker configuration device 202 can receive communication request 314. Communication request 314 can be received from a first microservice 316 deployed via microservice platform 200, which will typically be the sender or data provider. First microservice 316 can be substantially any microservice $102_1$-$102_N$ of FIG. 2. Microservice 318 can be the recipient or data consumer and can be any other microservice $102_1$-$102_N$ of FIG. 2. Thus, the sender or data provider can be distinguished from the recipient or data consumer in the transaction, as shown with message broker 320 the intermediary of communication 321.

Communication request 314 can represent a request for communication 321 between first microservice 316 and second microservice 318 that will be facilitated by message broker 320. In some embodiments, second microservice 318 can be deployed via microservice platform 200 or may be deployed elsewhere, such as on a different microservice platform that includes a different instance of broker configuration device 202.

As illustrated at reference numeral 322, broker configuration device 202 can configure message broker 320 to facilitate communication between first microservice 316 and second microservice 318. Broker configuration device 202 can select message broker 320 from among a group of message brokers 104, such as from among message brokers $104_1$-$104_M$ of FIG. 2. One or both the selection of message broker 320 and the configuration of message broker 320 can be based on one or both message broker data 310 or communication request 314.

As can be seen, broker configuration device 202 can operate to provide message broker 104 discovery and to mitigate any tight coupling between message brokers 104 and microservices 102 by, for example, configuring message brokers, 104, 320 on behalf of microservices 102. Additional detail and aspects are provided with reference to the remaining figures.

Figure 4:
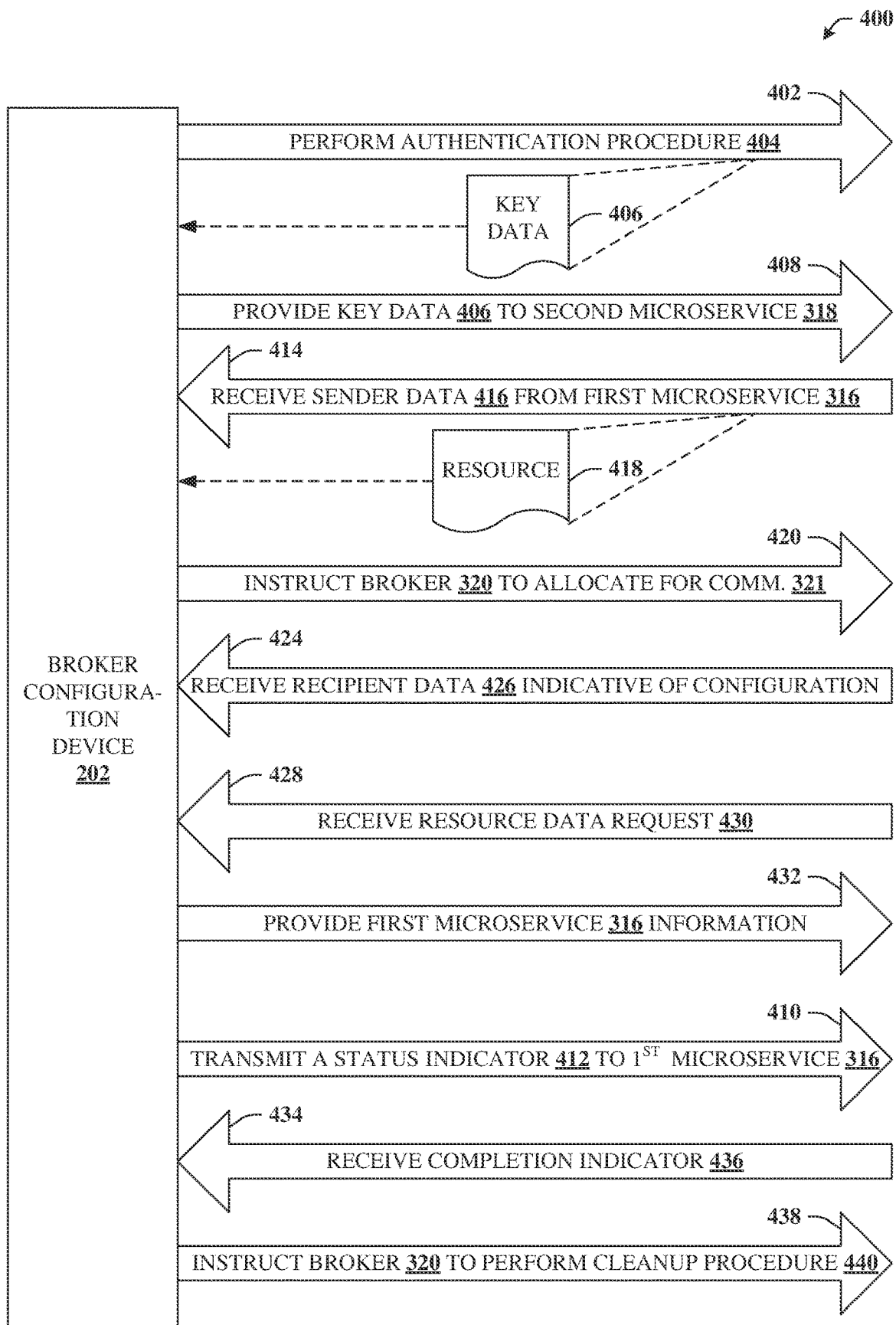
FIG. 4 illustrates schematic block diagram 400 that depicts additional elements or aspects of the broker configuration device in accordance with certain embodiments of this disclosure.

Turning now to FIG. 4, block diagram 400 is presented. Block diagram 400 depicts additional elements or aspects of broker configuration device 202 in accordance with certain embodiments of this disclosure. For example, as illustrated at reference numeral 402, broker configuration device 202 can perform an authentication procedure 404 with message broker 320. In some embodiments, authentication procedure 404 can occur after receiving communication request 314. Authentication procedure 404 can include providing credentials (e.g., username, password, . . . ) to message broker 320. Such can result in key data 406.

At reference numeral 408, broker configuration device 202 can provide key data 406 to second microservice 318. Thus, second microservice 318 can be authorized to receive forthcoming communication 321.

At reference numeral 414, broker configuration device 202 can receive sender data 416 from first microservice 316. Sender data 416 can be indicative of one or more resource 418 that is to be used for forthcoming communication 321 between first microservice 316 and second microservice 318.

At reference numeral 420, broker configuration device 202 can instruct message broker 320 to allocate one or more resources, such as resource 418, for forthcoming communication 321. In some embodiments, this allocation instruction can be part of the configuration of message broker discussed in connection with reference numeral 322 of FIG. 3. It is appreciated that any such configuration is performed by broker configuration device 202, relieving first microservice 316 from that responsibility that is tied to the design and/or implementation of the particular message broker 320.

At reference numeral 424, broker configuration device 202 can receive recipient data 426 from second microservice 318. Recipient data 426 can be indicative of a configuration to receive communication 321. This configuration to receive communication 321 can be based on one or both the selected message broker 320 and/or based on the resource 418 that was allocated for communication 321.

At reference numeral 428, broker configuration device 202 can receive a resource data request 430, which can be received from first microservice 316. Resource data request 430 can comprise a request for resource information of second microservice 318. This request can be satisfied and/or the requested resource details of the recipient determined from recipient data 426 that was received at reference numeral 424. Thereafter, the indicated information can be provided to first microservice 316 as indicated at reference numeral 432.

At reference numeral 410, broker configuration device 202 can provide status indicator 412 to first microservice 316. Status indicator 412 can indicate an operations status such as that for communication 321. For example, a suitable status indicator 412 can indicate that first microservice 316 can begin sending data to message broker 320 and/or otherwise commencing communication 321.

At reference numeral 434, broker configuration device 202 can receive a completion indicator 436. The completion indicator 436 can indicate that communication 321 has completed. Completion indicator 436 can be received from first microservice 316 or from any other suitable source such as from second microservice 318, an associated application or another source.

As shown at reference numeral 438, potentially in response to receipt of completion indicator 436, broker configuration device 202 can instruct message broker 320 to perform a cleanup procedure 440. Cleanup procedure 440 can release one or more resources (e.g., resource 418) allocated by message broker 320 for communication 321.

As indicated previously, broker configuration device 202 can be implemented to categorize the behavior of typical message brokers 104 into various stages, which are further illustrated with reference to FIGS. 5-7. Each stage indicates associated behavior by broker configuration device 202 to some extent.

Figure 5:
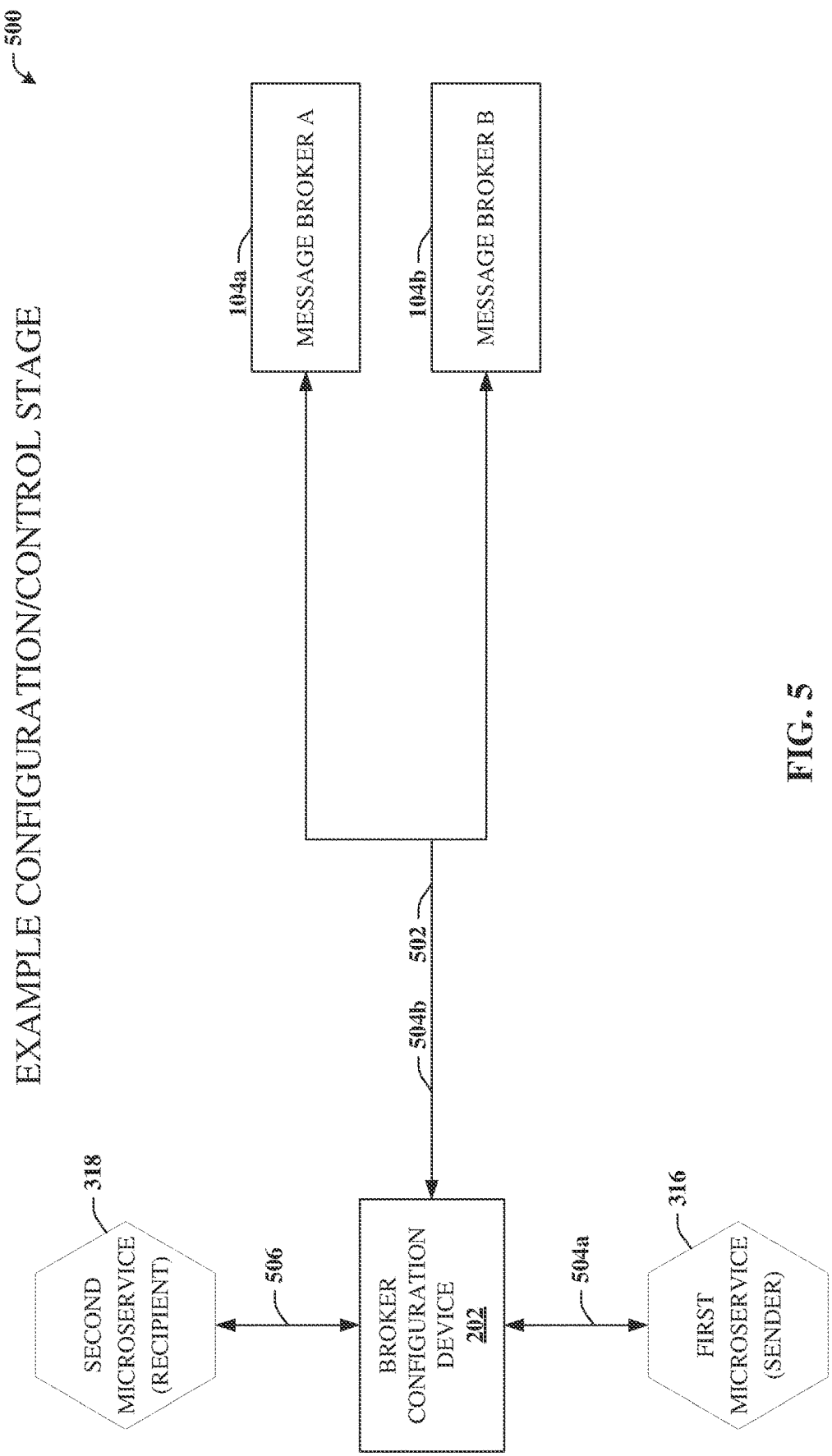
FIG. 5 depicts a schematic block diagram 500 is depicted illustrating broker configuration device behavior during a control or configuration stage in accordance with certain embodiments of this disclosure.

Referring now to FIG. 5, a schematic block diagram 500 is depicted illustrating broker configuration device 202 behavior during a control or configuration stage in accordance with certain embodiments of this disclosure. In this example, two microservices are presented, namely first microservice 316, which again acts as the sender and/or data producer, and second microservice 318, which is once more the recipient/data consumer. Here, there are two different message brokers 104, namely message broker 104a and message broker 104b.

Initially, as categorized as the configuration/control stage, broker configuration device 202, at reference numeral 502, authenticate with message broker(s) 104, including one or both message brokers 104a and 104b. Similar elements were detailed in connection with reference numeral 402 of FIG. 4. Authentication can be performed by providing credentials and providing some initial configuration. A key can result from the authentication. Key details can be returned and provided to second microservice 316.

At reference numeral 504a, first microservice 316 can create resources required for communication and provide that information to broker configuration device 202. Based on that information, broker configuration device 202 can, at reference numeral 504b, instruct a given message broker 104a, 104b to create the associated resources on behalf of first microservice 316. Similar elements were detailed in connection with reference numerals 414-420 of FIG. 4.

At reference numeral 506, broker configuration device 202 can obtain configuration information from second microservice 318 such as, e.g., application programming interface (API) information, key information, and so forth that is required to receive messages from a specific message broker 104 on a given resource (e.g., resource 418).

Figure 6:
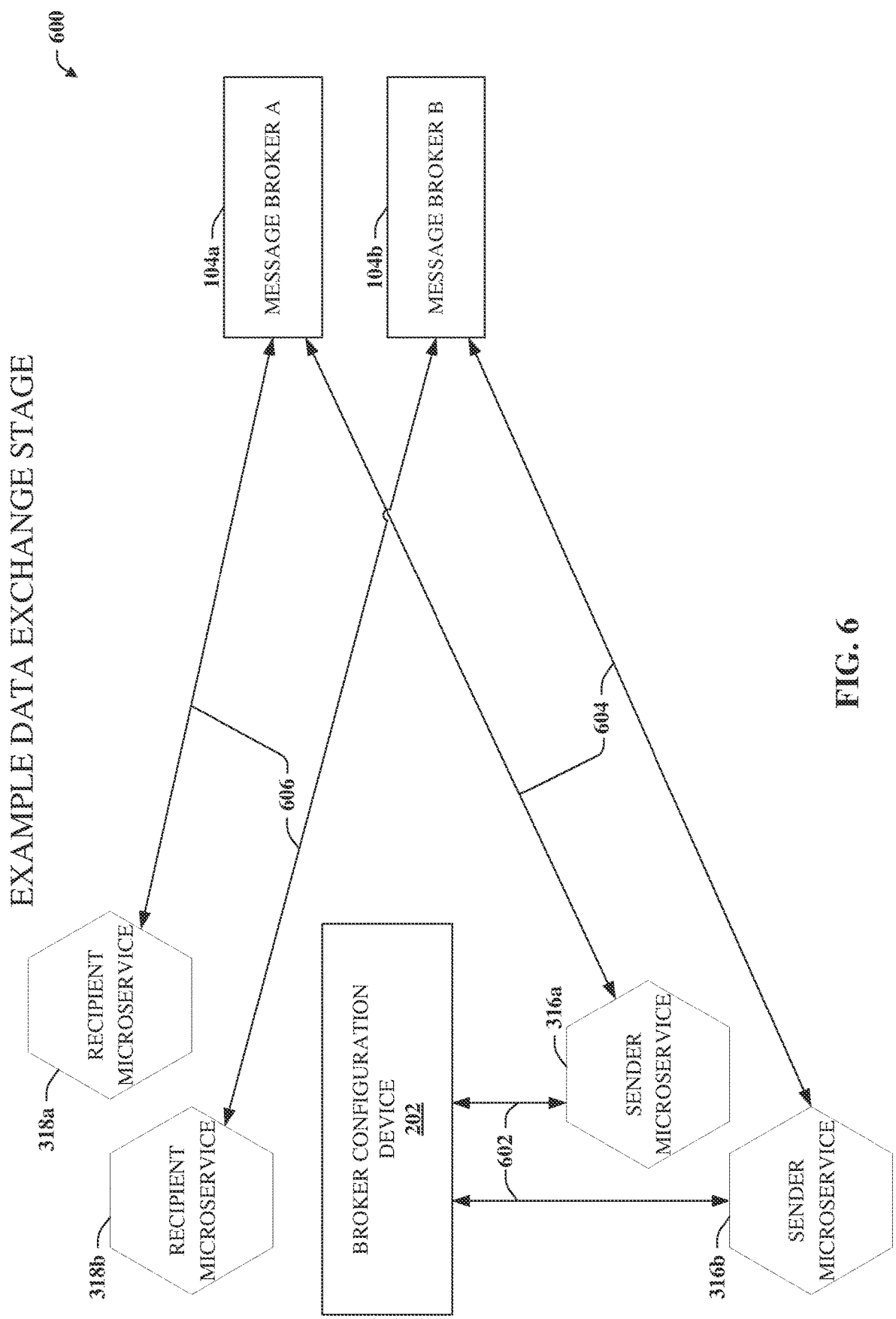
FIG. 6 depicts a schematic block diagram 600 illustrating broker configuration device behavior during a data exchange stage in accordance with certain embodiments of this disclosure.

With reference now to FIG. 6, a schematic block diagram 600 is depicted illustrating broker configuration device 202 behavior during a data exchange stage in accordance with certain embodiments of this disclosure. In this illustration, there are two sender microservices and two recipient microservices. Sender microservice 316a produces data to be consumed by recipient microservice 318a, with message broker 104a as the intermediary. Likewise, sender microservice 316b produces data to be consumed by recipient microservice 318b, with message broker 104b as the intermediary.

At reference numeral 602, sender microservices 316a and 316b can transmit a request for recipient information. Broker configuration device 202 can send the appropriate response to satisfy the request(s).

Thereafter, at reference numeral 604 messages can be sent directly to the respective message brokers, with messages from sender microservice 316a going to message broker 104a and with messages from sender microservice 316b going to message broker 104b. At reference numeral 604, recipient microservice 318a receives the messages directly from message broker 104a and recipient microservice 318b receives the messages directly from message broker 104b.

Figure 7:
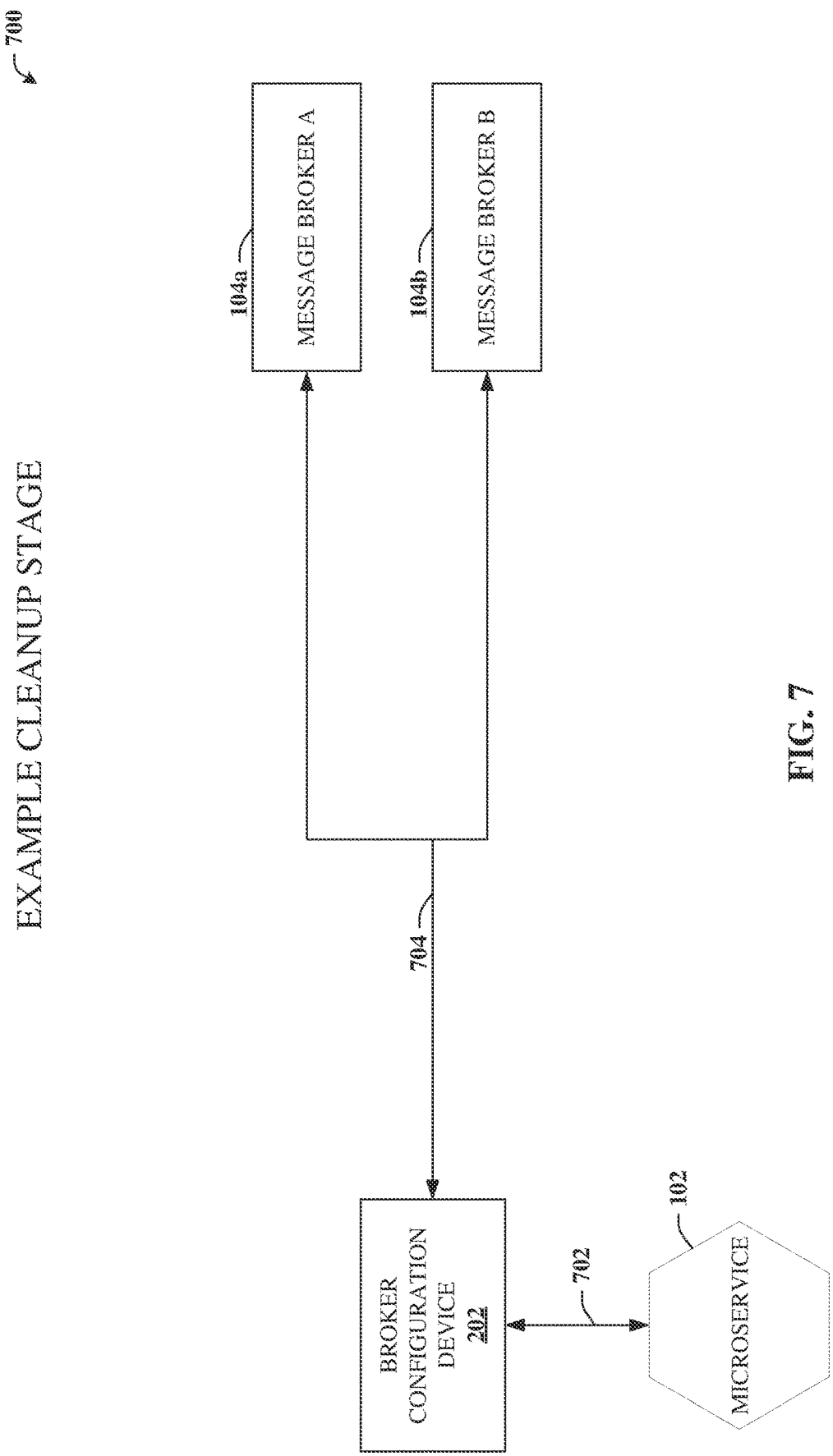
FIG. 7 depicts a schematic block diagram 700 illustrating broker configuration device behavior during a cleanup stage in accordance with certain embodiments of this disclosure.

Turning now to FIG. 7, a schematic block diagram 700 is depicted illustrating broker configuration device 202 behavior during a cleanup stage in accordance with certain embodiments of this disclosure. In this illustration, there is a single microservice 102 presented, which will typically be the sender microservice 316, but could also be the recipient microservice 318 is other embodiments, or a different entity altogether in still other embodiments.

At reference numeral 702, broker configuration device 202 can receive a request to cleanup one or more associated resources that were used for the indicated communication. In some embodiments, broker configuration device 202 can receive an indication that the communication has completed.

At reference numeral 704, broker configuration device 202 can instruct the associated message broker 104 to cleanup or release the associated resource(s).

Example Methods

Figure 8:
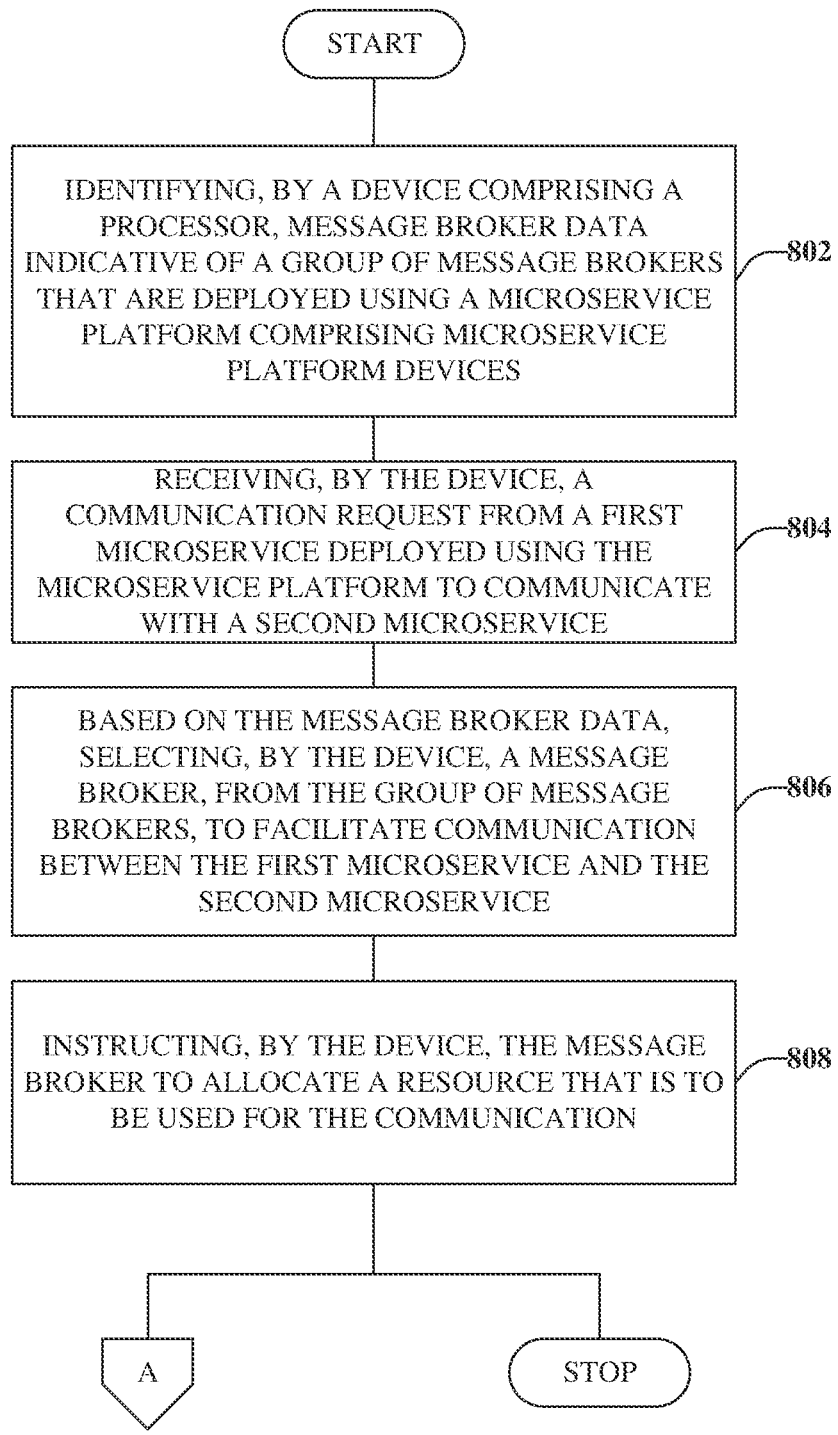
FIG. 8 illustrates an example method that can configure a message broker on behalf of a microservice for a data exchange in accordance with certain embodiments of this disclosure.
Figure 9:
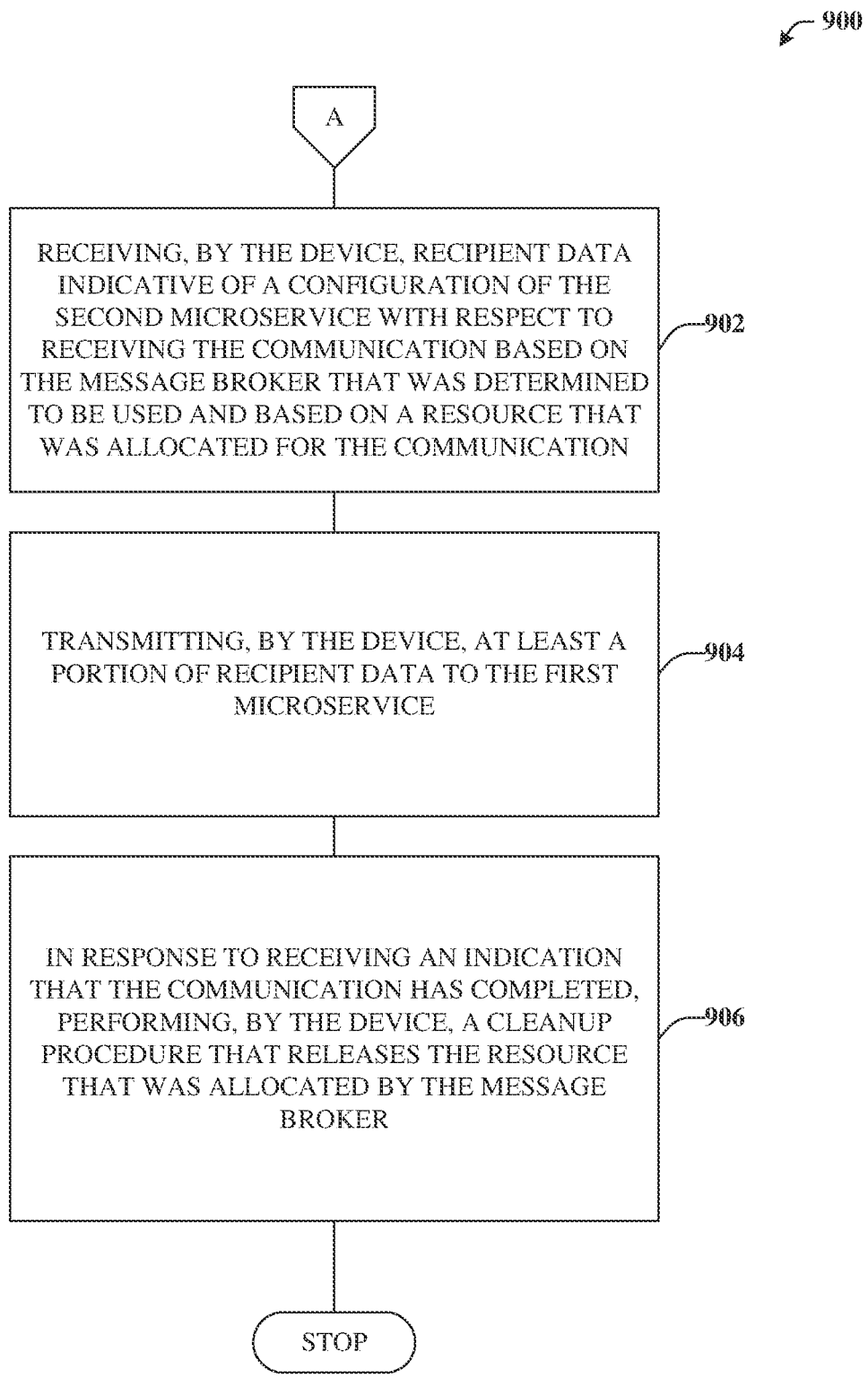
FIG. 9 illustrates an example method that can provide for additional aspect or elements in connection with configuring the message broker on behalf of a microservice in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 can configure a message broker on behalf of a microservice for a data exchange in accordance with certain embodiments of this disclosure. While method 800 describes a complete method, in some embodiments, method 800 can include one or more elements of method 900, as illustrated by insert A.

At reference numeral 802, a device comprising a processor can identify message broker data indicative of a group of message brokers that are deployed using a microservice platform comprising microservice platform devices. In some embodiments, message broker data can include other indicators such as an indication of a health of a message broker, whether the message broker is active, and so forth.

At reference numeral 804, the device can receive a communication request from a first microservice deployed using the microservice platform. The communication request can be a request to communicate with a second microservice, which, in some embodiments can also be deployed on the microservice platform, but could substantially be anywhere in which an different instance of the device is operating.

At reference numeral 806, the device can select a message broker to facilitate communication between the first microservice and the second microservice. The selected message broker can be selected from the group of message brokers that are deployed on the microservices platform. Further the message broker can be selected based on the message broker data received at reference numeral 804.

At reference numeral 808, the device can instruct the message broker to allocate a resource that is to be used for the communication. Hence, the message broker can be configured by the device on behalf of the first microservice. Method 800 can terminate or continue to insert A, which is further detailed in connection with FIG. 9.

Turning now to FIG. 9, exemplary method 900 is depicted. Method 900 can provide for additional aspect or elements in connection with configuring the message broker on behalf of a microservice in accordance with certain embodiments of this disclosure.

At reference numeral 902, the device introduced at reference numeral 802 comprising a processor can generate report data. The report data can describe the vulnerability. In more detail, the report data can comprise a first reference to the vulnerability and a second reference to the solution data. The first reference and the second reference can relate to descriptions, reference links, or the like.

At reference numeral 904, the device can receive recipient data. The recipient data can be indicative of a configuration of the second microservice with respect to receiving the communication. This configuration can be based on the message broker that was determined to be used and based on a resource that was allocated for the communication.

At reference numeral 906, in response to receiving an indication that the communication has completed, the device can perform a cleanup procedure with respect to the message broker. This cleanup procedure can comprise instructing the message broker to release one or more resources that were allocated by the message broker for the communication between the first microservice and the second microservice.

Example Operating Environments

Figure 10:
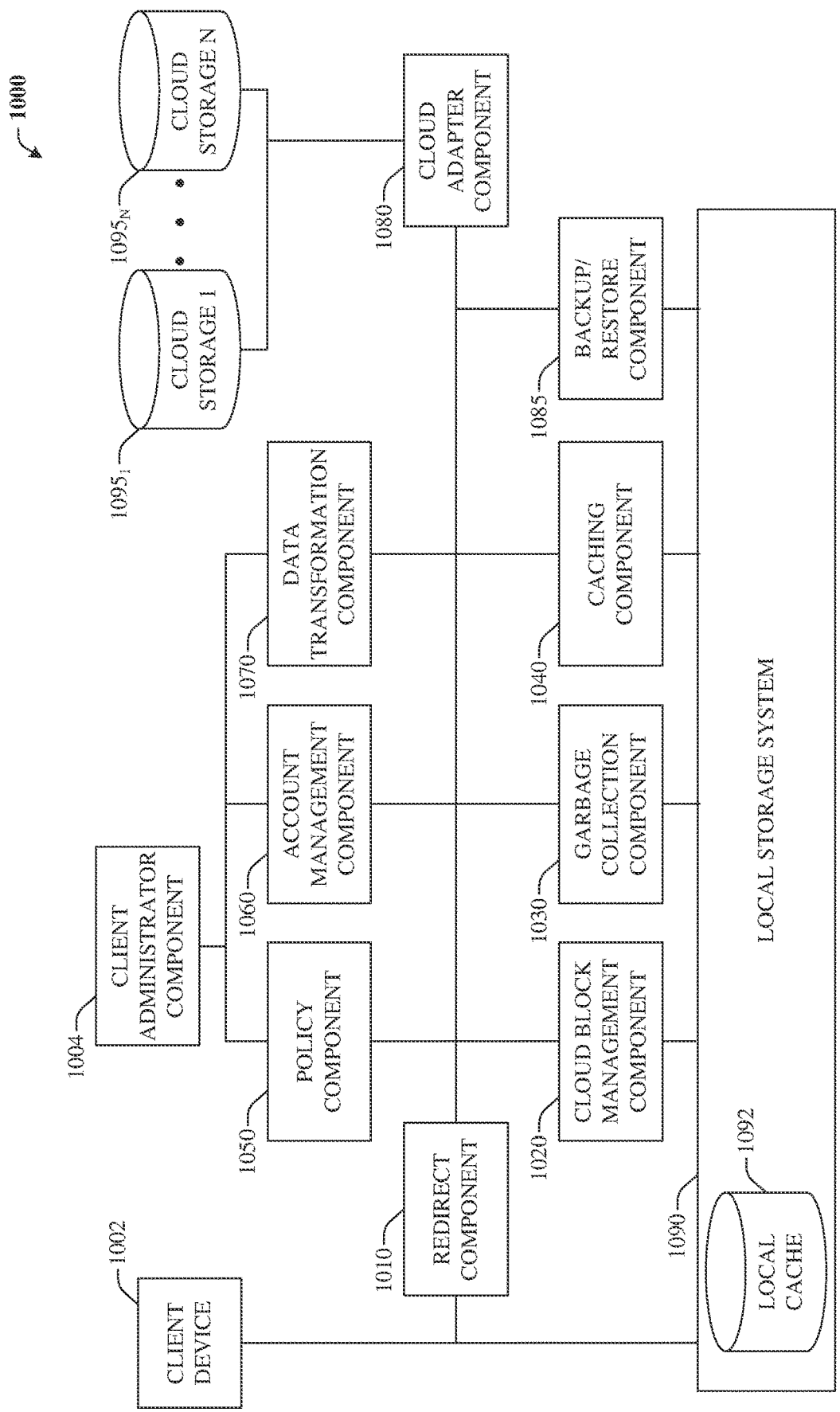
FIG. 10 illustrates a block diagram of an example distributed file storage system that employs tiered cloud storage in accordance with certain embodiments of this disclosure.
Figure 11:
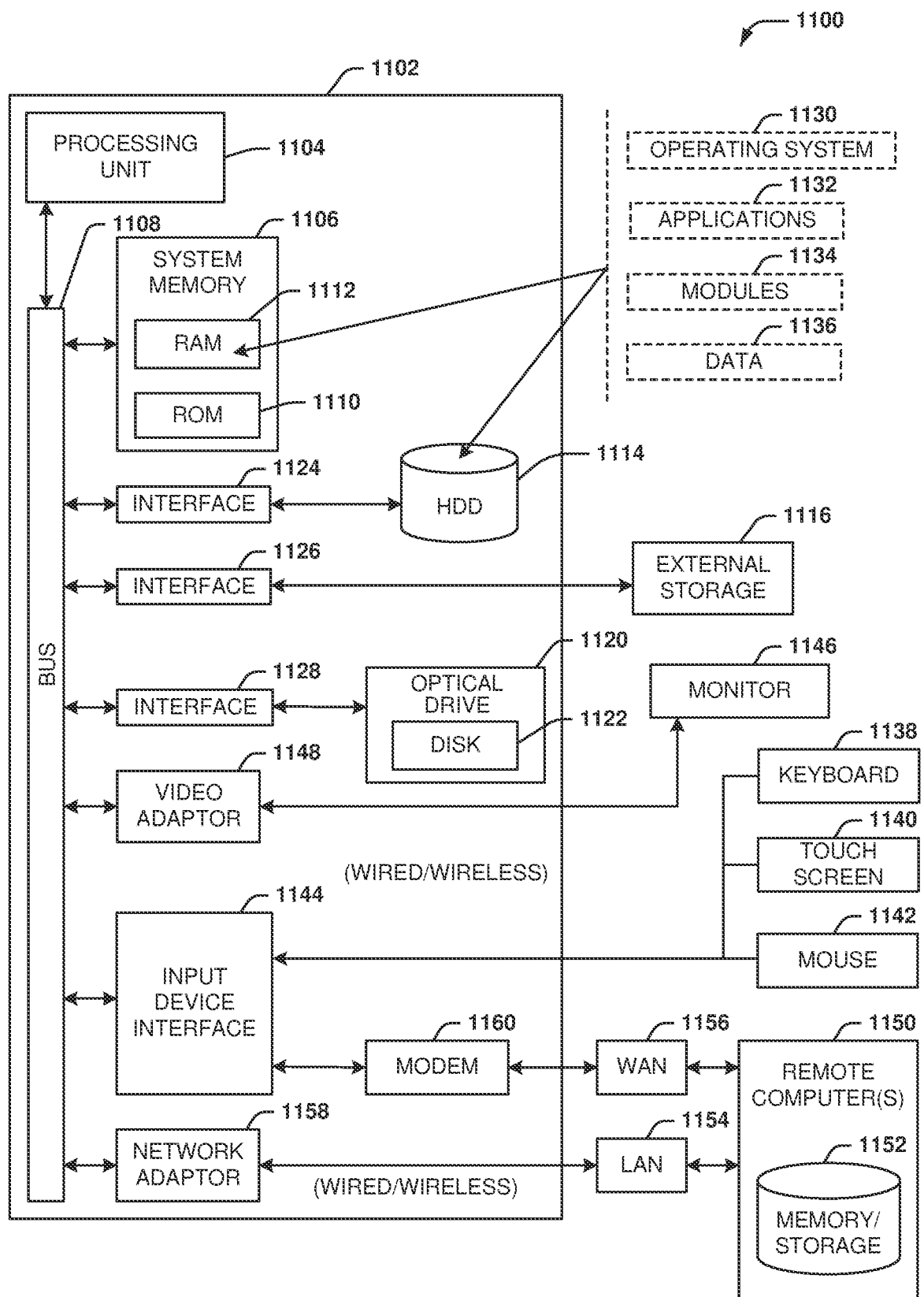
FIG. 11 illustrates an example block diagram of a computer operable to execute certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $1095_1$ and cloud storage N $1095_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a broker configuration device that configures a message broker for use by a first microservice that is not coded to interface with the message broker, the broker configuration device comprising:
   compatibility code indicative of respective instructions executable to interface with respective members of a group of message brokers, comprising the message broker, that are available via a microservices platform comprising microservice platform devices, and
   a processor; and
   a memory that stores executable instructions that, when executed by the processor, facilitate performance of operations, comprising:
      determining, by the broker configuration device, message broker data indicative of the group of message brokers;
      receiving, by the broker configuration device and from the first microservice deployed via the microservices platform, a communication request to communicate with a second microservice;
      based on the message broker data and the communication request, configuring, by the broker configuration device and via the compatibility code, the message broker, from the group of message brokers, to facilitate communication between the first microservice and the second microservice;
      receiving, from the first microservice or the second microservice, completion data that indicates that the communication has completed; and
      in response to the completion data, instructing the message broker to perform a cleanup procedure that releases a resource that was allocated by the message broker for the communication.

2. The device of claim 1, wherein the operations further comprise performing an authentication procedure with the message broker, resulting in key data.

3. The device of claim 2, wherein the operations further comprise providing the key data to the second microservice.

4. The device of claim 1, wherein the operations further comprise receiving, from the first microservice, sender data indicative of a resource that is to be used for the communication between the first microservice and the second microservice.

5. The device of claim 1, wherein the configuring the message broker comprises instructing, on behalf of the first microservice, the message broker to allocate a resource that is to be used for the communication between the first microservice and the second microservice.

6. The device of claim 1, wherein the operations further comprise receiving, from the second microservice, recipient data indicative of a configuration to receive the communication based on the message broker that was determined to be used and based on a resource that was allocated for the communication.

7. The device of claim 1, wherein the operations further comprise receiving, from the first microservice, a resource data request comprising a request for resource information of the second microservice.

8. The device of claim 1, wherein the operations further comprise transmitting, to the first microservice, at least a portion of recipient data that was received from the second microservice.

9. The device of claim 1, wherein the operations further comprise transmitting, to the first microservice, a status indicator that indicates a status of the communication.

10. A non-transitory computer-readable medium comprising instructions that, in response to execution, cause a system comprising a processor to perform operations, comprising:
   interfacing with a first microservice of a group of microservices deployed on a microservice platform comprising microservice platform devices;
   interfacing with a message broker of a group of message brokers that are deployed on the microservice platform;
   identifying message broker data indicative of the group of message brokers;
   receiving, from the first microservice, a communication request to communicate with a second microservice of the group of microservices;
   based on the message broker data, selecting the message broker that the first microservice is not coded to specifically use, from the group of message brokers, to facilitate communication between the first microservice and the second microservice;
   configuring, on behalf of the first microservice, the message broker to facilitate the communication;
   transmitting to the first microservice an indication that the communication can commence;
   receiving, from the first microservice or the second microservice, completion data that indicates that the communication has completed; and
   in response to the completion data, instructing the message broker to perform a cleanup procedure that releases a resource that was allocated by the message broker for the communication.

11. The non-transitory computer-readable medium of claim 10, wherein the operations further comprise performing an authentication procedure with the message broker, resulting in key data that is provided to the second microservice.

12. The non-transitory computer-readable medium of claim 10, wherein the operations further comprise instructing, on behalf of the first microservice, the message broker to allocate a resource that is to be used for the communication between the first microservice and the second microservice.

13. The non-transitory computer-readable medium of claim 10, wherein the operations further comprise receiving, from the second microservice, recipient data indicative of a configuration to receive the communication based on the message broker that was determined to be used and based on a resource that was allocated for the communication.

14. The non-transitory computer-readable medium of claim 10, wherein the operations further comprise receiving, from the first microservice, sender data indicative of a resource that is to be used for the communication between the first microservice and the second microservice.

15. The non-transitory computer-readable medium of claim 10, wherein the operations further comprise receiving, from the first microservice, a resource data request comprising a request for resource information of the second microservice.

16. The non-transitory computer-readable medium of claim 10, wherein the operations further comprise transmitting, to the first microservice, at least a portion of recipient data that was received from the second microservice.

17. A method, comprising:
   interfacing, by a device comprising a processor, with a first microservice of a group of microservices deployed using a microservice platform comprising microservice devices;
   interfacing, by the device, with a message broker of a group of message brokers that are deployed using the microservice platform;
   identifying, by the device, message broker data indicative of the group of message brokers;
   receiving, by the device, a communication request from the first microservice to communicate with a second microservice deployed using the microservice platform;
   based on the message broker data, selecting, by the device, the message broker with which the first microservice is not specifically designed to interface, from the group of message brokers, to facilitate communication between the first microservice and the second microservice; and
   on behalf of the first microservice, instructing, by the device, the message broker to allocate a resource that is to be used for the communication;
      receiving, from the first microservice or the second microservice, completion data that indicates that the communication has completed; and
   in response to receiving an indication that the communication has completed, performing, by the device, a cleanup procedure that releases the resource that was allocated by the message broker.

18. The method of claim 17, further comprising receiving, by the device, recipient data indicative of a configuration of the second microservice with respect to receiving the communication based on the message broker that was determined to be used and based on a resource that was allocated for the communication.

19. The method of claim 18, further comprising transmitting, by the device, at least a portion of recipient data to the first microservice.

20. The method of claim 17, further comprising invoking, by the device, an authentication procedure with the message broker, resulting in key data that is provided to the second microservice.

* * * * *